United States Patent [19]

Ohuchida

[11] Patent Number: 5,107,359
[45] Date of Patent: Apr. 21, 1992

[54] OPTICAL WAVELENGTH-DIVISON MULTI/DEMULTIPLEXER

[75] Inventor: Shigeru Ohuchida, Zama, Japan
[73] Assignee: Ricoh Company, Ltd., Tokyo, Japan
[21] Appl. No.: 440,275
[22] Filed: Nov. 22, 1989

[30] Foreign Application Priority Data

Nov. 25, 1988 [JP] Japan .................................. 63-297449

[51] Int. Cl.$^5$ .............................................. H04J 14/02
[52] U.S. Cl. ..................................... 359/124; 359/130
[58] Field of Search ..................... 370/3, 1; 350/96.16, 350/96.19; 359/124, 130

[56] References Cited

U.S. PATENT DOCUMENTS

| | | | |
|---|---|---|---|
| 4,387,955 | 6/1983 | Ludmom et al. | 370/3 |
| 4,744,618 | 5/1988 | Mahlein | 370/3 |
| 4,819,224 | 4/1989 | Laude | 370/3 |
| 4,834,485 | 5/1989 | Lee | 350/96.16 |

*Primary Examiner*—Reinhard J. Eisenzopf
*Assistant Examiner*—Kinfe-Michael Negash
*Attorney, Agent, or Firm*—Oblon, Spivak, McClelland, Maier & Neustadt

[57] ABSTRACT

An optical wavelength-division multi/demultiplexer for use in an optical multiplex communication, comprises a transparent substrate having opposite sides. A transmission off-axis diffraction grating is formed on one side of the substrate, for passing light incident thereon while diffracting and converging the same. A light reflecting element such as a transmission off-axis diffraction grating or flat specular reflection surface is provided on the other side of the substrate, for reflecting the light diffracted by the transmission off-axis diffraction grating toward the transmission off-axis diffraction grating.

6 Claims, 2 Drawing Sheets

OPTICAL WAVELENGTH-DIVISON MULTI/DEMULTIPLEXER

BACKGROUND OF THE INVENTION

The present invention relates to an optical wavelength-division multi/demultiplexer for use in an optical communication such as wavelength-division multiplex communication.

Recently, a necessity of high-speed processing for a great amount of information has been increased in an optical communication. One method for satisfying such a necessity is an optical multiplex communication. However, the optical multiplex communication has not been sufficiently widely used under present conditions due to the fact that a laser diode (LD) as the source of multiwavelength light and an optical wavelength-division multi/demultiplexer which is an integral component of the optical multiplex communication are too expensive.

Japanese Patent Application Laying Open (KOKAI) No. 61-180209 discloses an exemplary optical wavelength-division multi-demultiplexer comprising a single-sided diffraction grating element. The diffraction grating element comprises a plane reflection plate which is formed at one side thereof with a plane-curved diffraction grating made of a plurality of grating grooves. More specifically, the plane-curved diffraction grating is formed so as to effect a focusing action and is coated with an Aluminium film so as to effect a reflection type diffraction. A light-input optical fiber for leading a light beam onto the diffraction grating element and a plurality of light-output optical fibers each for receiving a diffracted light beam are disposed so as to confront the diffraction grating grooves. The diffraction grating element and the optical fibers are mounted at predetermined positions on the support members.

In the above-mentioned construction of the optical wavelength-division multi/demultiplexer, a multiwavelength light beam output from the light-input optical fiber is incident on the diffraction grating at which the light beam is reflected at different reflection angles in accordance with the respective wavelengths, thereby being focused on the different positions. Namely, as the multiwavelength light beam is reflected by the diffraction grating, the light beam is divided into a plurality of diffracted beams having different wavelengths, respectively.

Such a wavelength-division multiplexing system is simple in construction. However, the above-mentioned plane-curved diffraction grating is the so-called in-line type holographic lens, so it is difficult to increase the diffraction efficiency thereof.

Further, in the above-mentioned wavelength-division multiplexing system, the incident multiwavelength light beam is divided by the single diffraction grating, so it is difficult to focus in sufficient a wideband multiwavelength light beam emitted from a light emitting diode (LED), resulting in an increase of the coupling loss of each of diffracted beams to be received into the corresponding light-output optical fiber due to an increase of the size of each of the beam spots.

If it is possible to use a LED as the source of multiwavelength light instead of a laser diode (LD), the wavelength-division multiplex communication will become widespread, because the LED is inexpensive. In actual conditions, however, it is impossible to use a LED as the source of multiwavelength lightt for the above-mentioned multi/demultiplexer due to the above-described increased coupling loss, and accordingly, there is nothing else than the use of an expensive LD.

More specifically, when such a conventional diffraction grating element having a single diffraction grating, i.e., a single-sided diffraction grating element, is used, it becomes necessary to decrease the grating periodic distance or pitch thereof so as to effect Bragg diffraction of light while decreasing the depth of the grating grooves so as to equalize the size thereof to that of the grating pitch, in order to increase diffraction efficiency. In this case, i.e., in the case of Bragg diffraction, however, the size of each diffracted beam spot becomes larger than that of the optical fiber for receiving the diffracted beam due to the increased grating pitch, resulting in an increase of the coupling loss of each diffracted beam. Contrarily, when the grating pitch is increased so as to cause Raman-Nath diffraction, it becomes possible to decrease the coupling loss of each of the diffracted beams in relation to the corresponding optical fiber. In this case, however, the diffraction efficiency of light is decreased due to the occurrence of highest-order diffracted light beams, resulting in an increased insertion loss of diffracted light on the whole in the wavelength-division multiplexing device. Essentially, those situation will not be improved even though the diffraction grating is formed so as to have a lens function, as shown in the above-mentioned reference.

In view of the above-described problems, an optical wavelenth-division multi/demultiplexer utilizing a double-sided diffraction grating element for effectively multiplexing or demultiplexing a wideband multiwavelength light beam emitted from a LED was proposed by the present applicant. The double-sided diffraction grating element is disposed between collimating and focusing lenses between light-input and light-output optical fibers. The double-sided diffraction grating element comprises a planar substrate which is provided at opposite sides thereof with diffraction gratings, respectively. The diffraction characteristics of the two diffraction gratings are such that the grating surfaces thereof as well as the grating directions are parallel to each other, but the grating pitches thereof are different from each other. In addition, the relationship between the light-input angle of the diffraction grating and the light-output angle of the diffraction grating is predetermined so as to have a certain difference angle.

According to the above-mentioned double-sided diffraction grating element, a light beam to be multiplexed or demultiplexed is passed through the two diffraction gratings, which can cause the deflection angle between the input and output light beams to be decreased, while maintaining an increased diffraction efficiency. Such a function could not be obtained by the above-described single-sided diffraction grating element having a single diffraction grating. This is because that in the case of diffraction grating element of light transmission type, although it is necessary to effect Bragg diffraction in order to increase the diffraction efficiency, as previously described, the deflection angle between input and output light beams is increased under the condition of such Bragg diffraction due to the increased angle of diffraction. Comparatively, in the case of the above-mentioned double-sided diffraction grating element having at opposite sides thereof two diffraction gratings, each of the diffraction gratings can effect Bragg diffraction with a high diffraction efficiency under the condition of increased angle of diffraction, and the combination of the two diffraction gratings enables the decrease of the deflection angle between input and output light beams while maintaining such a high diffraction efficiency. By the use of an optical wavelength-division multi/demultiplexer which can ensure a high diffraction efficiency and a low deflection angle, wavelength-division for a wideband multiwavelength light such as light emitted from a LED can be effectively performed without a significant increase of the diameter of spot of the diffracted beam.

Although such a multiplexing/demultiplexing system using the above-mentioned double-sided diffraction grating element can ensure a superior performance, the multiplexing/demultiplexing system has a disadvantage in that it requires collimate and focusing lenses other than the double-sided diffraction grating element, and in that the double-sided diffraction grating element occupies a relatively large space because the same is of a transmission type.

SUMMARY OF THE INVENTION

It is therefore an object of the present invention to provide an optical wavelength-division multi/demultiplexer for use in an optical multiplex communication, which can perform optical multiplexing and/or demultiplexing action at a high diffraction efficiency and a low coupling loss, with the decreased size thereof and the decreased number of necessary optical elements thereof.

Another object of the invention is to provide an optical wavelength-division multi/demultiplexer which makes it possible to reduce the deflection angle between input and output light beams and thereby to reduce the size of spot of diffracted output beams even when a wideband multiwavelength light beam emitted from a LED is used as the input light beam, while maintaining a high diffraction efficiency with the decreased size thereof and the decreased number of necessary optical elements thereof.

The object of the present invention can be achieved by an optical wavelength-division multi/demultiplexer for use in an optical multiplex communication, comprising: a transparent substrate having opposite sides; a transmission off-axis diffraction grating provided on one side of the substrate, for passing light incident thereon while diffracting and converging the same; and a light reflecting means provided on the other side of the substrate, for reflecting the light diffracted by the transmission off-axis diffraction grating toward the transmission off-axis diffraction grating.

In the case that the multi/demultiplexer of the present invention is used as a multiplexer, a multiwavelength light beam is incident on the transmission off-axis diffraction grating at one side of the substrate from the outside thereof. The incident light beam passes through the transmission off-axis diffraction grating and is then incident on the reflection surface at the other side of the substrate while being diffracted by the lens action of the transmission off-axis diffraction grating as well as being focused thereby. The light beam is reflected by the reflection surface in the interior of the substrate and is then passed through the transmission off-axis diffraction grating again from the inside of the substrate to the outside thereof while being diffracted by the transmission off-axis diffraction grating as well as being focused thereby toward different positions. In this way, the wavelength-division of the multiwavelength light beam is performed.

Namely, the optical wavelength-division multi/demultiplexer according to the present invention can perform the wavelength-division multiplex of the multiwavelength light beam in substantially the same manner as that performed by the previously described optical wavelength-division multi/demultiplexer using a transmission double-sided diffraction grating element, without using a collimating and focusing lenses.

On the other hand, in the case that the multi/demultiplexer of the invention is used as a demultiplexer, a plurality of light beams having different wavelengths are incident on the transmission off-axis diffraction grating, respectively, and are then reflected by the reflection surface in the interior of the substrate. After that, the reflected light beams pass through the transmission off-axis diffraction grating again from the inside of the substrate to the outside thereof while being diffracted by the transmission off-axis diffraction grating as well as being focused thereby toward a single position. In this way, the light beams having different wavelengths can be demultiplexed.

Further, as apparent from the above-mentioned function of the multi/demultiplexer according to the invention, both light-input and light-output optical fibers can be disposed at one side of the substrate. Accordingly, the multi/demultiplexer of the invention can be fabricated in compact size.

Accordingly, the multi/demultiplexer of the invention can perform an optical multiplexing and/or demultiplexing action at a high diffraction efficiency and a low coupling loss, with the decreased size thereof and the decreased number of necessary optical elements thereof.

Preferably, the reflection surface is made of a reflection diffraction grating. In this case, the multi/demultiplexer makes it possible to reduce the deflection angle between input and output light beams and thereby to reduce the size of spot of diffracted output beams even when a wideband multiwavelength light beam emitted from a LED is used as the input light beam, while maintaining a high diffraction efficiency with the decreased size thereof and the decreased number of necessary optical elements thereof.

The reflection surface may be made of a planar specular reflection surface. In this case, the multi/demultiplexer having a structure which is substantially the same as that of the above-mentioned conventional single-sided diffraction grating element and thus can be made easily, can perform multiplexing and/or demultiplexing action which is substantially the same as that of a multi/demultiplexer having a double-sided diffraction grating element.

Further objects, features and advantages of the present invention will become apparent from the following description of the preferred embodiments of the invention as illustrated in the accompanying drawings.

DESCRIPTION OF THE PREFERRED EMBODIMENTS

First, the construction of a conventional optical wavelength-division multi/demultiplexer using a single-sided diffraction grating element will be described.

Figure 6:
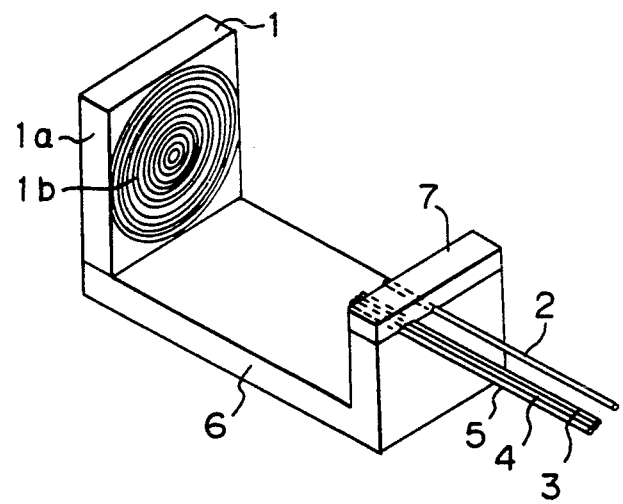
FIG. 6 is a schematic perspective view of a conventional optical wavelength-division multi/demultiplexer.

Referring to FIG. 6, the conventional multi/demultiplexer comprises a single-sided diffraction grating element 1 having a plane reflection plate 1a which is formed at one side thereof with a plane-curved diffraction grating 1b made of a plurality of grating grooves. The diffraction grating 1a is formed so as to effect a focusing action and is coated with an aluminium film so as to effect a reflection type diffraction. A light-input optical fiber 2 for leading a light beam onto the diffraction grating 1a for three light-output optical fibers 3, 4 and 5, each for receiving a diffracted light beam, are disposed so as to confront the diffraction grating 1a. The diffraction grating element 1 and the optical fibers are mounted at predetermined positions on the supports 6 and 7.

In the above-mentioned conventional multi/demultiplexer, a multiwavelength light beam output from the light-input optical fiber 2 is incident on the diffraction grating 1a at which the light beam is refelected at different reflection angles corresponding to the respective wavelengths, thereby being focused on the correseponding light-output optical fibers 3, 4 and 5. Namely, as the multiwavelength light beam is reflected by the diffraction grating 1a, the light beam is divided into a plurality of diffracted beams having different wavelengths, respectively.

Figure 7:
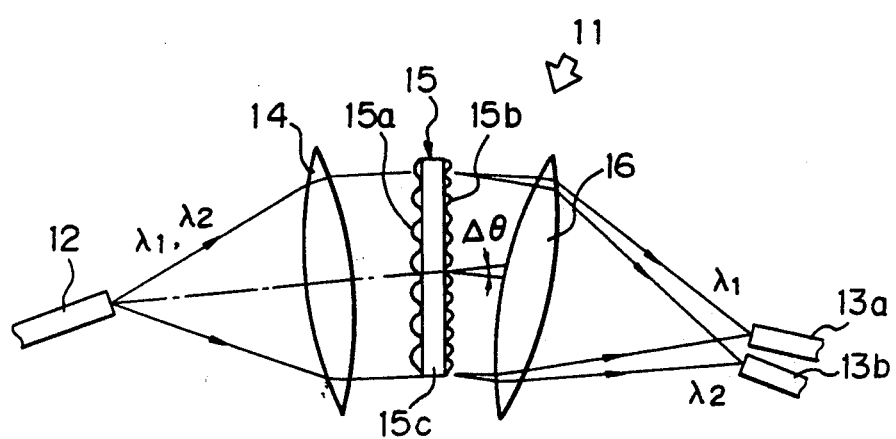
FIG. 7 is a schematic side view of a optical wavelength-division multi/demultiplexer using a double-sided diffraction grating element as well as collimating and focusing lenses.

Next, explanation will be made as to an optical wavelength-division multi/demultiplexer which was previously proposed by the present applicant, as mentioned above. Referring to FIG. 7, the optical wavelength-division multi/demultiplexer comprises a collimating lens 14, a double-sided diffraction grating element 15 of a transmission type, and a focusing lens 16 which are disposed between a light-input optical fiber 12 and two light-output optical fibers 13a and 13b. The double-sided diffraction grating element 15 comprises a planar substrate 15c which is provided at opposite sides thereof with diffraction gratings 15a and 15b, respectively. The two diffraction gratings 15a and 15b have diffraction characteristics which are different from each other at a point that although the grating surfaces thereof as well as the grating directions thereof are parallel to each other, the grating pitches thereof are different from each other. In addition, the characteristics of input-output angle of the two diffraction gratings are predetermined at cerain values, respectively.

The double-sided diffraction grating element comprises a collimating lens, a double-sided diffraction grating element and a focusing lens they are disposed between ligh-input and light-output optical fibers in the order from the light-input optical fiber. The double-sided diffraction grating element comprises a planar substrate made of transparent material. The substrate is provided at the opposite sides thereof with diffraction gratings, respectively. The diffraction properties of the two diffraction gratings 15a and 15b are such that the grating surfaces thereof as well as the grating directions are parallel to each other, but the grating pitches thereof are different from each other. In addition, the relationship between the light-input angle of the diffraction grating 15a and the light-output angle of the diffraction grating 15b is predetermined so as to have a certain difference angle ($\Delta\theta$). In this construction, after passing through the collimating lens 14 a light beam including two light signals having different wavelengths $\lambda_1$ and $\lambda_2$ is diffracted into two light beams having wavelengths $\lambda_1$ and $\lambda_2$, respectively, through the two diffraction grating elements 15a and 15b.

Figure 1:
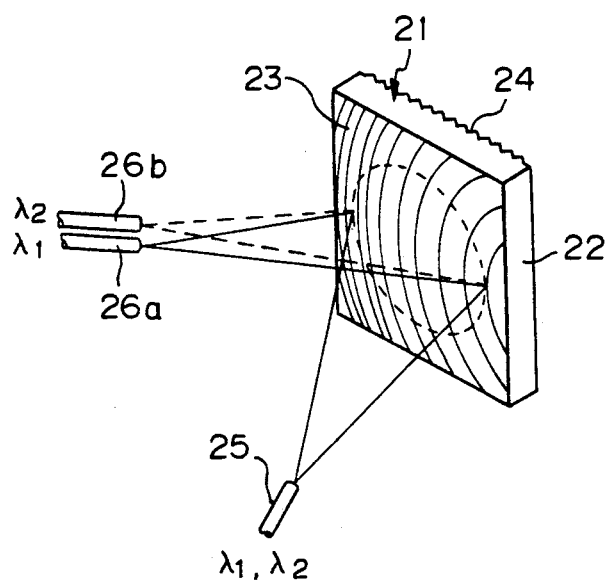
FIG. 1 is a schematic perspective view of an optical wavelength-division multi/demultiplexer illustrating a first embodiment of the present invention.
Figure 2:
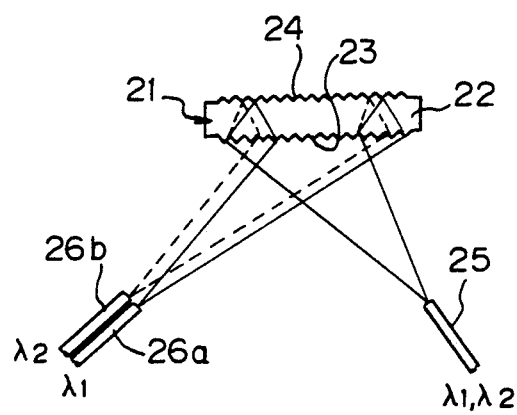
FIG. 2 is a plan view of the multi/demultiplexer shown in FIG. 1.

FIGS. 1 and 2 shows a first embodiment of the present invention, in which an optical wavelength-division multi/demultiplexer comprises inherently a double-sided diffraction grating element 21 of a reflection type. The diffraction grating element 21 comprises a substrate 22 which is provided at one side thereof with a transmission off-axis hologram lens 23 as a transmission type diffraction grating and is also provided at the other side thereof with a reflection type diffraction grating 24 as a reflection surface means. The diffraction grating element 21 may be made of plastics such as ultraviolet-setting material, for example, the so-called 2P-resin, or acryl.

A light-input optical fiber 25 for leading a multiwavelength light beam including light signals having different wavelengths $\lambda_1$ and $\lambda_2$, respectively, toward the transmission off-axis hologram lens 23, and two light-output optical fibers 26a and 26b for receiving diffracted light beams having different wavelenghts $\lambda_1$ and $\lambda_2$, respectively, are disposed at the same side of the diffraction grating element 21 on which the transmission off-axis hologram lens 23 is formed.

In the above-mentioned construction of the first embodiment, the multiwavelength light beam is led out from the light-input optical fiber 25 in the form of a diffusion light, and is then incident on the transmission off-axis hologram lens 23, at which the multiwavelength light beam is then converted to a parallel light beam by the lens action of the hologram lens 23, though, strictly speaking, it is impossible to convert both light beams having different wavelengths $\lambda_1$ and $\lambda_2$ into parallel light beams, respectively, due to chromatic aberration. After that, the multiwavelength light beam is incident on the reflection type diffraction grating 24 in the interior of the substrate 22, while being diffracted so as to be divided into two light beams having different wavelengths $\lambda_1$ and $\lambda_2$, respectively. These diffracted light beams pass through the transmission off-axis hologram lens 23 again and are then in focus on different positions, respectively, in accordance with their wavelengths $\lambda_1$ and $\lambda_2$ by virtue of the lens action of the hologram lens 23. Therefore, the light-output optical fibers 26a and 26b are disposed so as to receive the respective light beams.

In the above-mentioned first embodiment, it is important that the light beam(s) is subjected to the diffraction action of the plurality of diffraction gratings, for example, two diffraction gratings 23 and 24, as like as that in the above-described transmission type double-sided diffraction grating element as shown in FIG. 7. Namely, the diffraction grating element 21 is so constructed as to provide the diffraction action of the plurality of diffraction gratings on the light beams(s), in order to effect wavelength-division with high diffraction efficiency while preventing an increase of the size of the respective diffracted light beam spots even when a wideband multiwavelength light beam emitted from a LED is used. Accordingly, the reflection type diffraction grating element 21 makes it possible to increase the diffraction efficiency and also makes it possible to decrease the deflection angle. As the result, the optical wavelength-division multi/demultiplexer of the first embodiment makes it possible to effect wavelength-division of a wideband multiwavelength light beam output from a LED with a high diffraction efficiency, while decreasing coupling loss of the diffracted light beams.

As described above, one of the diffraction gratings on the one side of the diffraction grating element 21 has a lens function, while the other diffraction grating is of a reflection structure. Accordingly, collimating and focusing lenses such as shown in FIG. 7 can be eliminated from the optical wavelength-division multi-demultiplexer. Further, since the diffraction grating element 21 if of a reflection type, it is possible to decrease the occupying space of the optical wavelength-division multi/demultiplexer.

The reflection type diffraction grating 24 may have a function to correct chromatic aberration, which makes it possible to obtain a more higher performance of the optical wavelength-division multi/demultiplexer.

Figure 3:
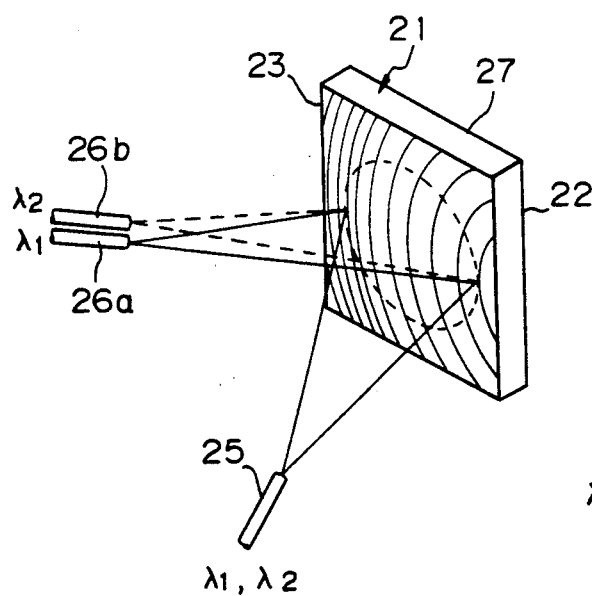
FIG. 3 is a schematic perspective view of an optical wavelength-division multi/demultiplexer illustrating a second embodiment of the present invention.
Figure 4:
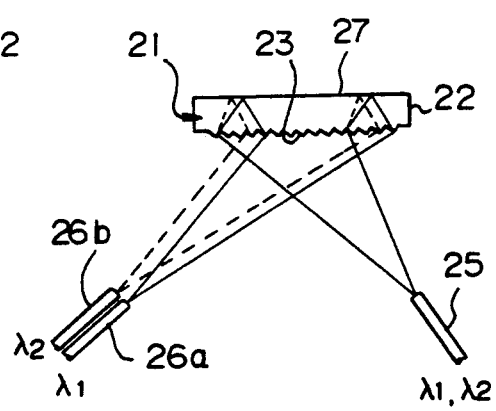
FIG. 4 is a plan view of the multi/demultiplexer shown in FIG. 2.

FIGS. 3 and 4 show a second embodiment of the present invention, in which a substrate 22a is provided at one side thereof with a transmission off-axis hologram lens 23, as like as the first embodiment, but at the other side thereof with a planar specular reflection surface 27 as a reflection surface means in place of a reflection type diffraction grating.

Since the transmission off-axis hologram lens 23 can create a relatively large chromatic aberration, the light beams in the multiwavelength light beam passed through the hologram lens 23 from the outside of the diffraction grating element 21 are incident on the specular reflection surface 27 at different incident angles corresponding to the respective wavelengths of the light beams. Accordingly, after being passed through the transmission off-axis hologram lens 23 again, the light beams are in focus on different positions, as like as those in the first embodiment.

According to the construction of the reflection type diffraction grating element 21 in the second embodiment, which is substantially the same as that of the above-mentioned conventional single-sided diffraction grating element and thus can be made easily, can perform multiplexing and/or demultimplexing action which is substantaiily the same as that of a multi/demultiplexer having a double-sided diffraction grating element.

Figure 5:
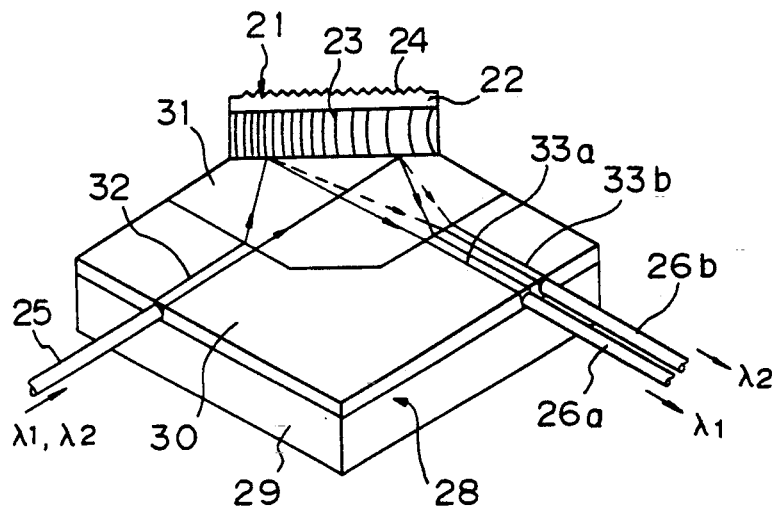
FIG. 5 is a schematic perspective view of an optical wavelength-division multi/demultiplexer illustrating a third embodiment of the present invention.

FIG. 5 shows a third embodiment of the present invention, in which a waveguide element 28 is provided for linking a diffraction grating element 21 which may have the same construction as that of the first or second embodiment and light-input and light-output optical fibers 25, 26a and 26b. The waveguide element 28 comprises a base substrate 29 and a light waveguide layer 30 provided thereon. The waveguide layer 30 is formed therein with a slab guide 31 at a position adjacent to the diffraction grating element 21 and is also formed therein with a light-input waveguide passage 32 and two light-output waveguide passages 33a and 33b, which extend between the slab guide 31 and the corresponding optical fibers 32p 33a and 33b.

In the above-mentioned construction of the third embodiment, a multiwavelength light beam comprised of light beams having different wavelengths $\lambda_1$ and $\lambda_2$, respectively, is received into the light-input waveguide passage 32 of the waveguide layer 30 in the form of a bat-coupling from the light-input optical fiber 25. Then, the multiwavelength light beam passes through the slab guide 31 in the form of diffusion light into the transmission off-axis hologram lens 23 of the diffraction grating element 21. On the other hand, after passing through the transmission off-axis hologram lens 23 from the inside of the diffraction grating element 21 to the outside thereof, the diffracted light beams having different wavelengths $\lambda_1$ and $\lambda_2$ are converged within the slab guide 31 and then received into the light-output waveguide passages 33a and 33b, respectively.

In this embodiment, the light waveguide layer 30 is an ion-exchange waveguide layer. A glass substrate may be used as the base substrate 29. The diffraction grating element 21 can be secured to the light waveguide layer 30 with a proper adhesive such as 2P-resin.

According to the construction of the third embodiment, it is possible to previously perform the positioning of the waveguide passages 32, 33a and 33b in accordance with the respective design values of the diffraction gratings 23 and 24 of the diffraction grating element 21. As the result, troublesome operations for alignment can be omitted, and a crosstalk can be decreased.

While the invention has been described in conjunction with specific embodiments thereof, it is evident that many alternatives and modifications will be apparent to those skilled in the art in light of the foregoing description. Accordingly, it is intended to include all such alternatives and modifications as fall within the spirit and scope of the appended claims.

What is claimed is:

1. An optical wavelength-division multi/demultiplexer for use in an optical multiplex communication, comprising:

a transparent substrate having opposite sides;

a transmission off-axis diffraction grating, provided on one side of the opposite sides of said substrate, for passing light incident thereon at a Bragg angle while diffracting and converging said incident light; and a light reflecting means, provided on an other side of the opposite sides of said substrate, for reflecting said light, diffracted and converge by said transmission off-axis diffraction grating, toward said transmission off-axis diffraction grating so that said incident light passes through said transmission off-axis diffraction grating twice.

2. A multi/demultiplexer according to claim 1, wherein said light reflecting means is a reflection type diffraction grating formed on said other side of said substrate.

3. A multi/demultiplexer according to claim 2, wherein said reflection type diffraction grating has a shape for correcting chromatic aberration created by said transmission off-axis diffraction grating.

4. A multi/demultiplexer according to claim 1, wherein said light reflecting means is a flat specular reflection surface formed on said other side of said substrate.

5. An optical wavelenght-division multi-demultiplexer for use with a first optical fiber for transmitting a multi-wavelength light including a plurality of light signals having different wavelengths, respectively, and with a plurality of second optical fibers for transmitting respective light signals having different wavelengths, respectively, comprising:

a transparent substrate having opposite sides;

a transmission off-axis diffraction grating, provided on one side of the opposite sides of said substrate, for passing light incident thereon at Bragg angle while diffracting and converging said incident light; and a light reflecting means, provided on an other side of the opposite sides of said substrate, for reflecting said light, diffracted and converged by said transmission off-axis diffraction grating, toward said transmission off-axis diffratction grating so that said incident light passes through said transmission off-axis diffraction grating twice, p1 wherein said first and second optical fibers are disposed at said one side of said substrate.

6. A multi/demultiplexer according to claim 5, wherein said optical wavelength-division multi/demultiplexer is connected with said first and second optical fibers through a waveguide element comprising a base substrate and a waveguide layer formed thereon, said wavelength layer being formed with a slab guide adjacent to said transmission off-axis diffraction grating and with light wavelength passages each extending between said slab guide and one of said first and second optical fibers.

* * * * *